(12) United States Patent
Gustavson et al.

(10) Patent No.: US 9,213,680 B2
(45) Date of Patent: Dec. 15, 2015

(54) METHOD AND STRUCTURE FOR FAST IN-PLACE TRANSFORMATION OF STANDARD FULL AND PACKED MATRIX DATA FORMATS

(75) Inventors: Fred Gehrung Gustavson, Briarcliff Manor, NY (US); John A. Gunnels, Yorktown Heights, NY (US); James C. Sexton, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 1601 days.

(21) Appl. No.: 11/849,272

(22) Filed: Sep. 1, 2007

(65) Prior Publication Data

US 2009/0063607 A1 Mar. 5, 2009

(51) Int. Cl.
*G06F 17/16* (2006.01)
*G06F 7/78* (2006.01)
*G06F 12/02* (2006.01)

(52) U.S. Cl.
CPC ...... *G06F 17/16* (2013.01); *G06F 7/78* (2013.01); *G06F 12/0207* (2013.01); *G06F 2212/454* (2013.01)

(58) Field of Classification Search
USPC ................... 708/400–401, 514, 520
See application file for complete search history.

(56) References Cited

U.S. PATENT DOCUMENTS 7,031,994 B2 * 4/2006 Lao et al. ............... 708/400
7,386,582 B2 * 6/2008 Gustavson et al. ......... 708/520
7,469,266 B2 * 12/2008 Gustavson et al. ......... 708/520
7,487,195 B2 * 2/2009 Gustavson et al. ......... 708/520
7,505,946 B2 3/2009 Chellapilla et al.
7,571,435 B2 * 8/2009 Gustavson et al. ......... 717/161
7,844,630 B2 * 11/2010 Gustavson et al. ......... 707/791
2006/0161607 A1 * 7/2006 Gustavson et al. ......... 708/200

OTHER PUBLICATIONS

Gustavson, F.G.: High Performance Linear Algebra Algorithms using New Generalized Data Structures for Matrices. IBM Journal of Research and Development 47(1), 31-55 (2003).*
Elmroth, E., Gustavson, F.G., Kagstrom, B., Jonsson, I.: Recursive Blocked Algorithms and Hybrid Data Structures for Dense Matrix Library Software. SIAM Review 46(1), 3-45 (2004).*

* cited by examiner

*Primary Examiner* — Chat Do
*Assistant Examiner* — Matthew Sandifer
(74) *Attorney, Agent, or Firm* — Daniel P. Morris; McGinn IP Law Group, PLLC (57) ABSTRACT

A method and structure for an in-place transformation of matrix data. For a matrix A stored in one of a standard full format or a packed format and a transformation T having a compact representation, blocking parameters MB and NB are chosen, based on a cache size. A sub-matrix A1 of A, A1 having size M1=m*MB by N1=n*NB, is worked on, and any of a residual remainder of A is saved in a buffer B. Sub-matrix A1 is worked on by contiguously moving and contiguously transforming A1 in-place into a New Data Structure (NDS), applying the transformation T in units of MB*NB contiguous double words to the NDS format of A1, thereby replacing A1 with the contents of T(A1), and moving and transforming NDS T(A1) to standard data format T(A1) with holes for the remainder of A in buffer B. The contents of buffer B is contiguously copied into the holes of A2, thereby providing in-place transformed matrix T(A).

18 Claims, 5 Drawing Sheets

(RELATED ART)

METHOD AND STRUCTURE FOR FAST IN-PLACE TRANSFORMATION OF STANDARD FULL AND PACKED MATRIX DATA FORMATS

CROSS-REFERENCE TO RELATED APPLICATIONS

The present Application is related to the following co-pending application:

U.S. patent application Ser. No. 11/035,933, filed on Jan. 14, 2005, to Gustavson et al., entitled "METHOD AND STRUCTURE FOR CACHE AWARE TRANSPOSITIONS VIA RECTANGULAR SUBSECTIONS"; and U.S. patent application Ser. No. 11/045,354, filed on Jan. 31, 2005, to Gustavson et al., entitled "METHOD AND STRUCTURE FOR A HYBRID FULL-PACKED STORAGE FORMAT AS A SINGLE RECTANGULAR FORMAT DATA STRUCTURE", both assigned to the present assignee, and incorporated herein by reference.

BACKGROUND OF THE INVENTION

1. Field of the Invention

The present invention generally relates to improving efficiency of in-place data transformations such as a matrix transposition. More specifically, part of the data to be transformed is pre-arranged, if necessary, to first be contiguously arranged in memory as contiguous blocks of contiguous data, which data is then available to be retrieved from memory into cache in units of the blocks of contiguous data, for application of a transformation on the data such as a matrix transposition, and then replaced in memory. The part of the data not transformed is saved in a buffer and later placed out-of-place back into holes of the transformed data.

2. Description of the Related Art

As an example of the type of data transformations that the present invention can make more efficient, there are in-place algorithms for matrix transposition that works on individual matrix elements. Because the individual matrix elements must be referenced in an essentially random order for large M and N these codes run very slowly. U.S. Pat. No. 7,031,994 to Lao, et. al., partially addresses this problem.

However, as explained in more detail below, the results of Lao have quite limited scope. In many instances where the technique works, a fair amount of extra storage is used. They assume the underlying permutation is known but give no indication on how they find this structure or the amount of extra storage required.

Thus, as one possible application demonstrating the method of the present invention, there exists a need for a more efficient method of in-place matrix transposition, one that has generic capability regardless of its size and shape of the given input matrix.

However, transposition of matrix data is only one possible application of the method of the present invention since it is directed to the more generic problem of performing an in-place transformation of a matrix represented in one of the two standard formats of matrices to the same matrix data in another matrix format such as new data structures (NDS) where it will be able to apply the transformation in a fast manner.

An example is the matrix transposition discussed in Lao, et al. Several other examples will now be given. NDS for the two standard formats of matrices, full and packed matrices are given in "High-performance linear algebra algorithms using new generalized data structures" by Gustavson. For full format, the square block (SB) format of order NB is defined as an example of an NDS. In the present invention, we generalize NDS include rectangular block (RB) format of size MB by NB.

Thus, returning to examples that could utilize the method of the present invention, another example is to transpose a RB matrix of size M by N in-place. Another example is to transform a lower SBPF matrix to an upper SBPF matrix. A third example is to transform a packed matrix to a RFP matrix, as described in the second above-identified co-pending application. All three examples here admit inverse transformations so we really have six examples.

In the context of the present invention, the term "transformation" means that N data points map into each other as a permutation of the originally-stored N data points. The term "in-place" means that the permutation of N data points is returned to the same memory location as that used for the original data. A typical transformation will be accomplished by using a CPU of the computer to perform the transformation mapping algorithm.

The term NDS, standing for new data structures, is a term describing novel ways of storing the elements of full and packed matrices in a computer. The idea behind NDS is to represent the storage layout of a matrix as a collection of contiguous sub-matrices each of size MB by NB. MB and NB are chosen so that MB*NB is about the size of a cache.

The present invention addresses the problem noted by the inventors that a data transformation, including in-place data transformations, involve a mapping between the original data stored in memory and the relocated data as desired by the transformation. The problem being more specifically addressed involves the inefficiency resultant from conventional transformation methods applied to matrices in standard formats wherein data to be moved must be moved as single words randomly to other single words in the memory space. This happens almost all the time when the data in matrices is represented in standard matrix formats. When data is retrieved from memory and moved to a cache for purpose of the transformation processing, the desired data word is located in memory and retrieved as one data word of a chunk of memory words called a memory line of size LS that will, in general, contain LS–1 other words that are not be applicable for the processing or at least not immediately needed for the processing. A typical value of LS is 128 bytes or 16 double words.

Therefore, in recognizing the random nature of data movement governed by the matrix transformations for matrices stored in standard formats, the present inventors recognized that data transformations of single words of data can be quite inefficient, because the data retrieved for executing the transformation algorithm by the CPU will, in general, only contain only one of LS words that will be consumed by the transformation algorithm.

Thus, a need exists to improving efficiency of data transformations by ensuring that all data currently needed for the execution of the transformation algorithm are being retrieved from memory contiguous lines of size LS, thereby precluding the needless handling of data not currently needed nor wanted.

SUMMARY OF THE INVENTION

In view of the foregoing, and other, exemplary problems, drawbacks, and disadvantages of the conventional systems, it is an exemplary feature of the present invention to provide a structure (and method) in which in-place data transformations are more efficiently executed on a computer.

In a first exemplary aspect of the present invention, described herein is a computerized method for an in-place transformation of matrix data, including, for a matrix A stored in one of a standard full format or a packed format and a transformation T having a compact representation, choosing blocking parameters MB and NB based on a cache size; working on a sub-matrix A1 of A, A1 having size M1=m*MB by N1=n*NB and saving any of a residual remainder of A in a buffer B, the sub-matrix being worked on as follows: contiguously moving and contiguously transforming A1 in-place into a New Data Structure (NDS), applying the transformation T in units of MB*NB contiguous double words to the NDS format of A1, thereby replacing A1 with the contents of T(A1), moving and transforming NDS T(A1) to standard data format T(A1) with holes for the remainder of A in buffer B, and contiguously copying buffer B into the holes of A2, thereby providing in-place transformed matrix T(A).

In a second exemplary aspect of the present invention, also described herein is an Apparatus including a memory to store a matrix A in one of a standard full format or a packed format and instructions for performing a transformation T having a compact representation, at least one cache, and a processor choosing blocking parameters MB and NB based on a cache size of said at least one cache and working on matrix A in the manner of the method just described.

In an exemplary third aspect of the present invention, also described herein is a machine-readable medium tangibly embodying a program of machine-readable instructions executable by a digital processing apparatus to perform a computerized method for an in-place transformation of matrix data, as described above.

BRIEF DESCRIPTION OF THE DRAWINGS

The foregoing and other purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Referring now to the drawings, and more particularly to FIGS. 1-6, there are two exemplary embodiments of the method and structures according to the present invention. The first exemplary embodiment involves the standard full format and the second exemplary embodiment discussed thereinafter in lesser detail is the standard packed format.

Figure 1:
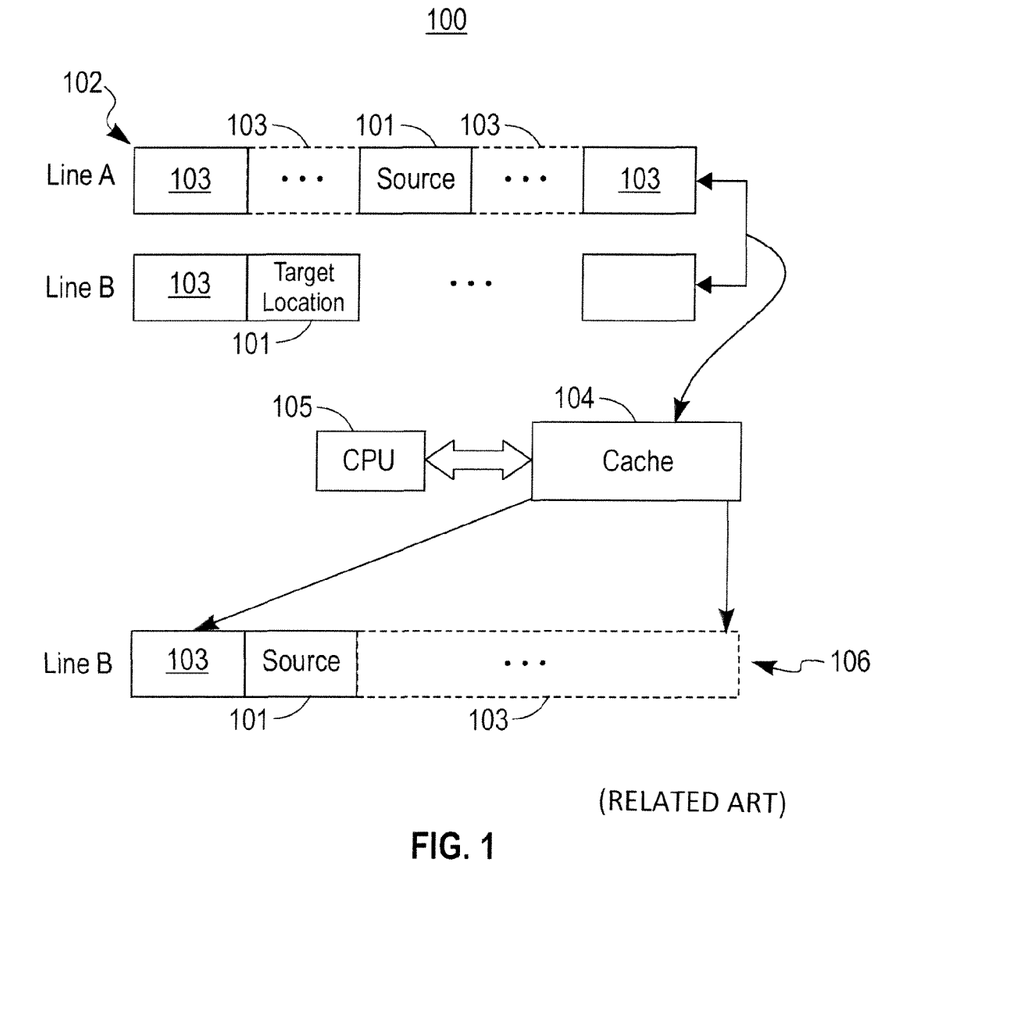
FIG. 1 shows the problem with conventional in-place data transformations 100.

FIG. 1 shows exemplarily how a typical conventional in-place data transformation 100 occurs, wherein data word 101 of interest is retrieved as one word in a memory line 102 containing additional words 103 that, in general, will not be needed in the transformation algorithm immediately by the transformation. Only data word 101 will be processed at the present time from line 102 using the transformation algorithm by moving the data into cache 104, using the CPU 105 for executing the transformation, and returned to memory in accordance with its new location for the data word 101.

The remaining data words 103 will not be used in the immediate transformation processing. In general, the data word 101, and its neighbors 103 retrieved from memory for the transformation processing is more or less "randomly placed" in memory, when viewed from the perspective of how data is actually processed during the transformation. Hence, the neighbors of word 101, words 103 will almost never be used during this time instance of processing. Of course, the words 103 will be processed at later time instances, some have already been processed earlier time instances.

Figure 2:
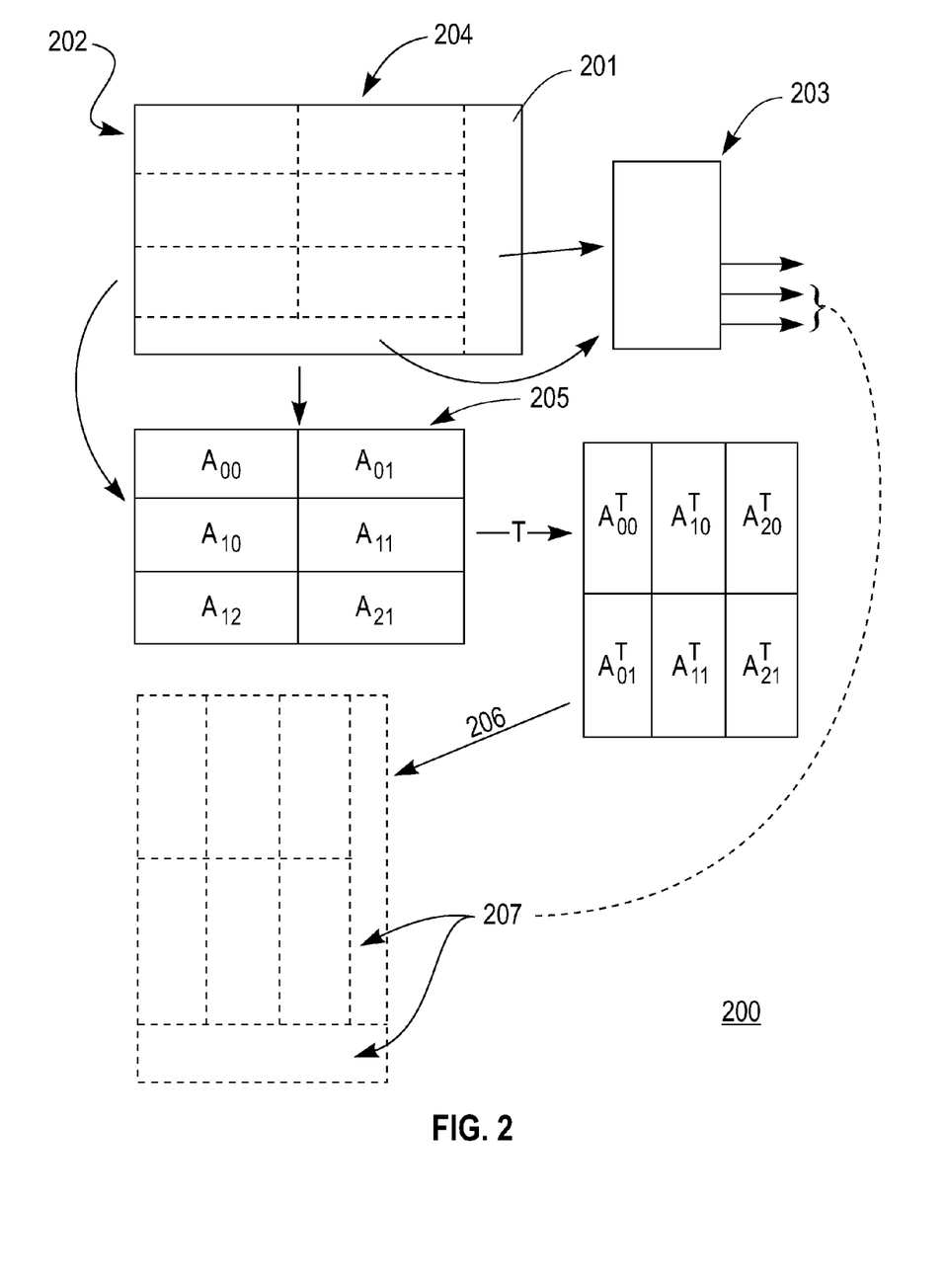
FIG. 2 shows the concepts 200 of the present invention wherein a small amount of residual data is separated out and subsequently placed back into holes left after the bulk of the data has been transformed.

In contrast, as exemplarily shown in FIG. 2 shows, as a description of the general concepts 200 of the present invention, rather than retrieving data for a transformation from memory as prescribed by transformation T in a random manner shown in FIG. 1, the present invention teaches to save a tiny piece 201 of the matrix 202 in a "buffer" B 203 and then contiguously move or contiguously transform the remaining matrix A1 204 to a NDS called rectangular block (RB) format 205.

Transformation processing T can now be applied to the RB matrix 205, but now each single element move is a RB move of size MB*NB contiguous elements (e.g., A00, . . . A21). This result can be returned to standard format using contiguous moves or contiguous transforms 206 (with holes 207 for the contents of the buffer B 203) by fast move or other fast transform operations. Finally, the buffer B contents are copied into the holes 207.

Thus, by reason of this buffer saving and moving or transforming to RB format, T can be applied to RB's. The move or transform steps and their reverse steps will consist of data movements on vectors of contiguous data. Hence, all these data movement will be done at the fastest possible memory rates on today's processors. More data is moved; however, it is moved at the maximum rate and overall the processing time is reduced. This overcomes the inefficiency of handling data needlessly or data not even related to the processing. In an exemplary embodiment, the data is always moved as a blocks or vectors of contiguous data.

In contrast to the conventional method, the present invention teaches that in-place data transformations of matrices stored in standard format will process much more efficiently when time is taken preliminarily to place the data into NDS consisting of blocks representing sub matrices.

The size of the data blocks and vectors depends upon the cache and line sizes of a specific computer and operating system and might be, for example, a memory line of data, as a minimum, but would more typically include multiple memory lines of data. The block and vector sizes will also depend upon the size of the working area of the cache into which memory data is retrieved for processing by a CPU (central processor unit). The small amount of data moved into the buffer space is the additional amount of space that the NDS requires over the standard input data. Since we must use the original array area we produce a slightly smaller instance of the original data and save two of its borders in the buffer.

The data transformation processing on NDS will then take each data block and execute the transformation very efficiently using the contiguous data of the blocks. In an in-place transformation, the transformed data will then be returned to a different memory location from which it was retrieved. Another requirement of the present invention is that of "compact representation" of a transformation. A transformation T (permutation) of size N maps 0 to N−1 onto itself. The transformation T is compact if it can be represented by a formula that uses a constant amount of space, independent of N.

For example: N−1=m*n−1, where m and n are the row size and column size of a matrix A. let k=i+m*j and T(k)=j+i*n, where 0≤I<m and 0≤j<n. so 0≤k≤N. Here (i,j) represents the storage address of A(i,j). This description of T is compact because there a formula requiring constant space that specifying where any given element of A gets mapped to under T.

In contrast, an example of a non-compact description is: m=3, n=2, N=6 T(0)=4, T(1)=3, T(2)=2, T(3)=5, T(4)=0, T(5)=1. This description is non-compact because it takes as many storage elements to describe the transformation as there are number of elements to be transformed.

Returning now to the specific example of data transformation as being matrix transposition, such as described in Lao et al., the new invention presents a solution that works in all cases, rather than specific examples such as described therein.

The present invention is based on choosing a block size MB by NB where MB*NB usually lies somewhere between the size of L1 and L2 caches. If M is not a multiple of MB or N is not multiple of NB then not more than N*MB+(M−MB)*NB extra storage is required for the buffer B. This concept of block size as based on cache sizes is referred to herein as "cache blocking." It is noted that "buffer" is used as a generic term that implies a bit of additional memory and could be a hardware buffer but would more typically be a small portion of memory that is used to store the data. Thus, in this context, "buffer" would mean "buffer space" in the memory.

The additional preliminary step of rearranging data into contiguous blocks based on block size can be advantageously used for both performance reasons and storage reasons in many applications of Dense Linear Algebra, in addition to transposition example discussed herein.

The following discussion shows that cache blocking is amenable to in-place matrix transposition. The advantage is a huge performance gain. The conventional method demonstrated in Lao et. al. has an incomplete vector solution or a square block solution. This means it only works in relatively few cases. Where it fails, slow solution methods as described above in FIG. 1 will be used. Furthermore, the present inventors view the invention described in Lao as potentially non-enabled, since there are numerous places where sufficient detail is lacking. Finally, relative to the present invention, the methods of Lao use too much additional storage, as will be demonstrated shortly.

It is noted that the novel solution described in the present invention also has a good symmetric multi-processor (SMP) parallel implementation. Moreover, other Dense Linear Algorithm matrices, such as full triangular matrices and packed triangular matrices, are also amenable to the main idea of this method, as demonstrated by the exemplary second embodiment discussed later.

An Example of the First Exemplary Embodiment

The following discussion provides an example using a matrix of size 1000 by 100. It is noted that there is no need in this example to store a small residual amount in a buffer space, since the choice of MB and NB happens to consume all of the original data.

Figure 3:
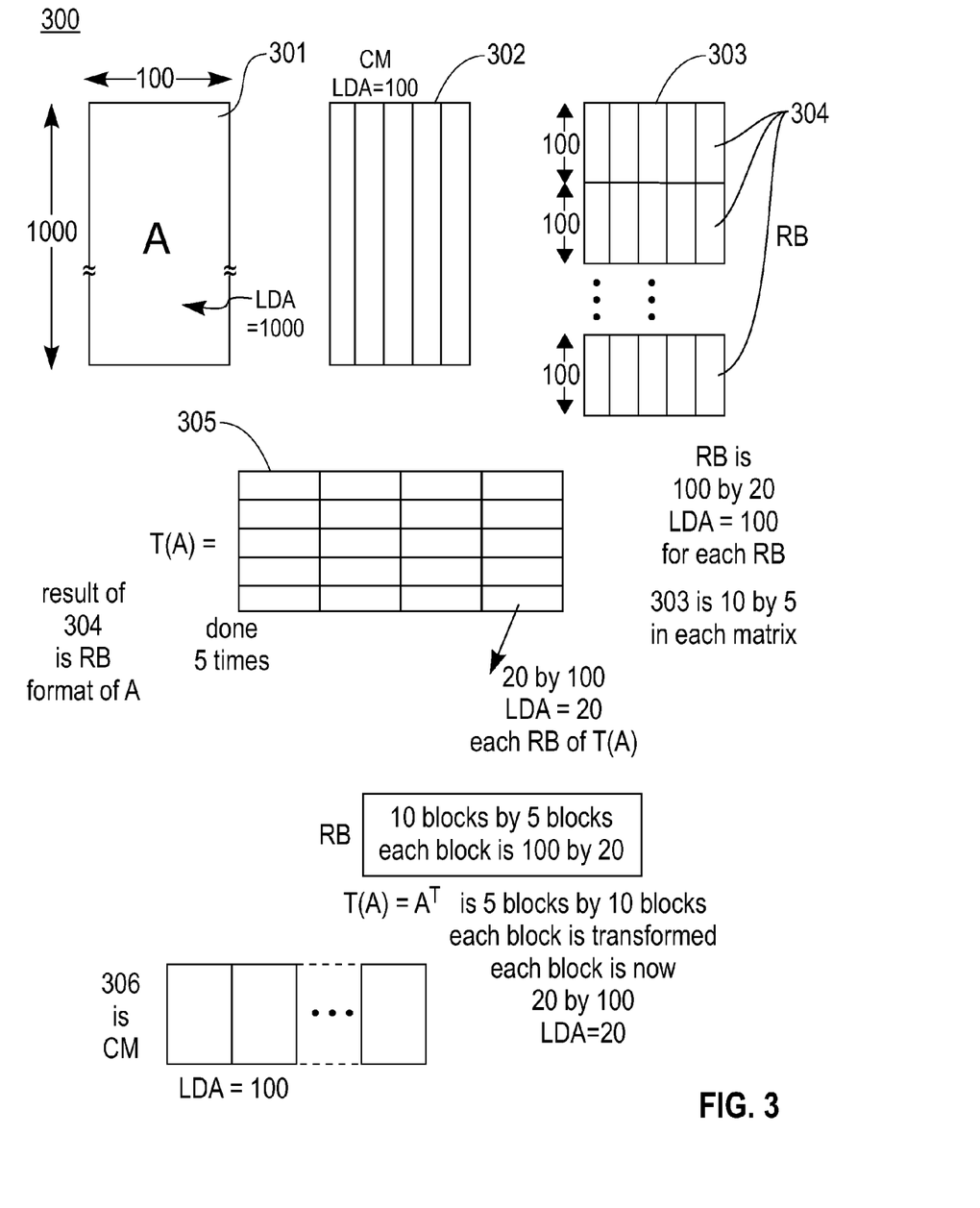
FIG. 3 shows the method 300 of the present invention as used in an example with matrix A being size 1000×100.

FIG. 3 shows graphically 300 this example, using exemplarily a matrix A, 301, of size M=1000 rows by N=100 columns. The format matrix A is standard Column Major (CM) order of the FORTRAN and C programming languages. The LDA of A is equal to M.

In a first step, the M by N matrix A has its format changed in-place to Rectangular Block (RB) format 302 where the size of each RB 303 is MB by NB where MB=100 and NB=20.

That is, matrix A 301 can be considered to be broken down into five columns, each having ten smaller sub matrices A1, 303, all sub matrices having size MB=100 by NB=20. Note that Steps 1 and 2 of the IRX algorithm, provided shortly ahead in the discussion, are no-operations and that MB is unequal to NB.

An in-place vector transposition is then performed on each column swath A1, 303, resulting in a vector transpose 304 of each A1. During this vector transpose each of the five A1's are transform from standard CM format with LDA=1000 to a RB format where each RB has an LDA=100. The vector length is MB=100 the rectangular matrix RM of vectors is size m by NB or 10 by 20. The mapping MAP(k)=mod(k*NB,Q) where Q=m*NB−1=199. Here k=i+LDA*j where LDA=m represents the (i,j) element of RM and 1≤k<Q. Elements (0,0) and (m−1,NB−1) map into themselves; they are called singleton cycles. Let us follow the cycles starting at k=1 and 3. These are called leaders:

Coset generated by leader 1:

1 20 2 40 4 80 8 160 16 121 32 43 64 86 128 172 57 145 114 91 29
182 58 165 116 131 33 63 66 126 132 53 65 106 130 13 61 26 122 52
45 104 90 9 180 18 161 36 123 72 47 144 94 89 188 178 177 157 155
115 111 31 23 62 46 124 92 49 184 98 169 196 139 193 79 187 158 175
117 151 35 103 70 7 140 14 81 28 162 56 125 112 51 25 102 50 5 100 10

Coset generated by leader 3:

3 60 6 120 12 41 24 82 48 164 96 129 192 59 185 118 171 37 143 74
87 148 174 97 149 194 99 189 198 179 197 159 195 119 191 39 183 78
167 156 135 113 71 27 142 54 85 108 170 17 141 34 83 68 166 136 133
73 67 146 134 93 69 186 138 173 77 147 154 95 109 190 19 181 38 163
76 127 152 55 105 110 11 21 22 42 44 84 88 168 176 137 153 75 107
150 15 101 30

Each of the cycles has length 99. So, there are four cycles, of lengths 1,1, 99, 99, These four cycles cover all 200 vector elements of RM. This is step 3 of IRX coding given later, and subroutine VIPX is called n=5 times. Each A1 now consists of m=10 RB's of size MB*NB=200000. Now A is a concatenation of the n=5 A1's, 304 and, hence, A is now in RB format consisting of a m=10 by n=5 RB matrix. Call this RB matrix A2. Each (i,j) element of A2 is RB. There are 10 block rows and 5 block columns. Also, see box 304. Now we turn to the block transpose map in box 305. The Block Map M=map(i, j)=mod(j+5*i,49). We follow (1,0) which has cycle length φ(49)=42.

1 5 25 27 37 38 43 19 46 34 23 17 36 33 18 41 9 45 29 47
39 48 44 24 22 12 11 6 30 3 15 26 32 13 16 31 8 40 4 20
2 10

Next we follow (7,0) which has cycle length 6.

7 35 28 42 14 21

Block Map M^-1 inverse map(i,j)=mod(+10*i,49)
We follow (1,0) which has cycle length 42.

```
1 10 2 20 4 40 8 31 16 13 32 26 15 3 30 6 11 12 22 24
44 48 39 47 29 45 9 41 18 33 36 17 23 34 46 19 43 38 37 27
25 5
```

Next we follow (7,0) which has cycle length 6.

```
7 21 14 42 28 35
```

Note that M^-1 has the cycles going backwards instead of forwards. This is always true.

We now describe the Block Map M=map(i,j) in high level detail. Full details are given in reference "In-place Transposition of Rectangular Matrices" by Gustavson and Swirszcz.

The cycle of (1,0) of length 42 is moving sub matrix blocks of size MB*NB=2000. Hence i refers to memory locations i*2000:(i+1)*2000−1. For example, take i=18. The map M says take the block at 18*2000:19*2000−1 and move it transposed to the block at M(18)=41 or 41*2000:42*2000−1.

The modulus Q=m*n−1=10*5−1=49=$7^2$. 49 has 3 divisors.

| d | φ(d) | cL | # c | d | φ(d) | cL | # c |
|---|---|---|---|---|---|---|---|
| 49 | 42 | 42 | 1 | 1 | 1 | 1 | 1 |
| 7 | 6 | 6 | 1 | 7 | 6 | 1 | 1 |
|  | 48 |  | 2 |  |  |  | 1 |

The Block Map M get divided into 3 disjoint sub-problems each governed by Eulers φ function applied to one the 3 divisors of Q. For example φ(Q) is 42 and there are 42 elements of A2 that are relatively prime to Q. One of these is (1,0) corresponding to integer 1 which is relatively prime to Q. Integer 1 generates a cycles of length 42.

This single cycle generates all φ(Q) elements of A2 relatively prime to Q. So, divisor Q will handle 42 elements of A2 as a single cycle of length 42. There are two more disjoint problems to handle, each associated with one of the remaining two divisors of Q. For each of these two divisors d the size of the problem is φ(d) elements of A2. We state that every one of these φ(d) elements of a given problem of size d constitute φ(d) elements of Block A2 that are randomly placed in Block A2. So, according to the Block map M these φ(d) block elements of A must be accessed in a block random manner.

Now we come to one of significant points of the method of the present invention. The elements within a block are contiguous. Recall that MB=100 and NB=20. Each sub matrix block contains MB*NB=2000 elements, which are stored in 2000 contiguous memory locations. A common line size is 16 double words. The entire block is brought from memory as 125=2000/16 lines. This is the fastest possible form of memory transfer to cache. Furthermore, every element of each of these 125 lines will be used as this sub matrix block is moved to another empty contiguous memory location consisting MB*NB double words.

At this point, we have T(A) or box 305. Note that each 100 by 20 block has been transposed to be a 20 by 100 block with LDA=20. In box 306 we need to take each of the 10 sets of columns and transform each set from RB format to CM format. See step 5 of IRX in the pseudo code provided in the discussion ahead. The result is box 306 and the matrix there is in CM format with LDA=100. This the final answer. This step is like Step 3. So, we not carry out the details of this mapping.

As an aside, Lao does not mention any of this permutation detail. Lao does say that his permutations occupy Q space, plus pointer space for the cycle leaders. For every problem, Q=m*n−1 and the number of cycles is usually much less than Q. Now we can say what Lao would do with this problem. Lao's works with M*q columns of A. Here N=100=n*q. q should be large but M*q should fit into cache. Let us set q=5. In Box 108 of Lao he says "apply a permutation to the matrix". We think Lao means that his matrix is a vector matrix VM of vectors of length q with M rows and n columns.

What is wanted is VM^T. The mapping MAP(k)=mod(k*n, Q) where Q=M*n−1=19999. Here k=i+LDA*j where LDA=M represents the (i,j) element of A and 1≤k<Q. Now, k=1 corresponding to vector element (1,0) of length q=5 has a cycle length cL of size 136 which is a divisor of φ(Q). Now Q=7*2857 and φ(Q)=$2^4$*$3^2$*7*17. Theory tells us there are φ(Q)/cL=126 leaders for this sub-problem. Lao does not say how he finds these 126 leaders which is only part of the problem of finding permutation P associated with vector matrix VM. Lao does say he explicitly stores P whose length is 20000.

Additionally, Lao stores all the cycle leaders as pointers. So, Lao stores more than 20126 words which is more than a 20% additional storage overhead. Finally, Lao's vector length is q=5. Since LS is 16, Lao only obtains 31.25% efficiency; 11 of 16 elements in every line is not used due the random nature of the mapping.

Thus, from the above example, it can be seen that a key idea of the method of the present invention is to convert a matrix A having size M by N in standard CM format into RB (Rectangular Block) format. This can be done by a series of fast transformations. One gets a smaller RB matrix A2 of size m by n where M=m*NB and N=n*NB. One finds the cycle structure of A2 by applying the point algorithm of PA B to A2. In matrix A2 each cycle move in A2 consists of moving the transpose of a size MB by NB sub matrix of A2 to another empty location of A2 of size MB*NB. A buffer of size MB*NB is required do all of the moves.

When M is not a multiple of MB and N is not a multiple of NB there are two sub matrices of size r by N and s by M that border A in its last r rows and its last q columns. r=M−m*MB and q=N−n*NB. These sub matrices are moved to a buffer B and then one can deal with a truncated matrix A1 of size M−r by N−q. Note that A1 has its row size M1 and its column size N1 as multiples of MB and NB respectively. We now identify A1 with the matrix A in what follows. So, A1 here will have the same size as the RB matrix A2 above. A1 is currently in column major (e.g., CM) order.

We now briefly describe how one gets from standard column major (CM) format to RB format. Let M=m*MB and consider NB contiguous columns of CM A1 where N=n*NB; call this matrix A3.

Think of A3 as an m by NB matrix whose elements are column vectors of length MB. A3 is a column swath of matrix A1. There are n swaths and they constitute the full A1. Now, apply the point algorithm described in "In-place Transposition of Rectangular Matrices", by Gustavson and Swirszcz, to this m by NB matrix A3 of vectors of length MB. The result is that now A3 has been replaced (over-written) as A3^T which is a size NB by m matrix of vectors of length MB.

It turns out, as a little reflection will indicate, that A3^T consists of m RB matrices of size MB by NB concatenated together. One can do this operation in parallel for each of these n=N/NB sub matrices A3 of A1. After completion of these n parallel steps one has transformed CM A in-place to be A2 as a RB matrix consisting of m*n RB's.

The process of going from an A2 in RB format to an A1 in CM format is the "transpose" of the above procedure; i.e., given NB by m A3^T one transposes A3^T to (A3^T)^T (=A3) in-place to get m by NB A3 in CM format.

Suppose M is not a multiple of MB and N is not a multiple of NB. We save the last r rows of A and the last q columns of A in a buffer S. Next, we move forward the first m*NB rows and n*NB columns of A into a compact space of size m*MB*n*NB.

Call this new compact matrix B. B has its M a multiple of MB and its N a multiple of NB. So, we can transpose B in place by the methods we have already described. Call this result C=B^T. We then expand C into the space M*N.

We then use the two matrices of buffer S and transpose them out-of-place into the vacant places of the expanded C matrix. We have now described the features of the algorithm.

The SMP parallel algorithm is obtained by letting a different processor move the disjoint cycles associated with the small m by n matrix A2. If A2 only has a few large cycles then one cuts these cycles into several pieces. Each processor can move a disjoint piece of a single large cycle.

The pseudo code capable of executing the above verbal description is as follows.

that many matrices, especially large ones have M so large that not a single column of A fits into cache. Let N=n*q. In FIG. 1 of Lao, the first step, boxes 104 to 106, is to perform n out-of-place transposes of column swaths of A if size q. In the present invention, with MB=q, we have matrix A1 and do an in-place vector transpose of n different A3's n times. Our buffer is size is sometimes MB=NB=q whereas Lao's buffer is size M*q. Next, Lao applies a permutation vector, box 108, to the result of their step 1. No details are given about box 108 except in column 10 lines 35 to 50. This 16 line description is considered inadequate. Further note that at line 50 there is a break in the continuity of Lao: The matrix beginning at line 52 is a square matrix and this matrix belongs to Lao's description of FIGS. 3 and 4.

Note that lines 12 to 34 of column 10 describe boxes 100 to 106 of FIG. 1. There is some hand-waving here; see lines 20 to 26. Lines 17 to 19 limit Lao in two essential ways. For example, when N is prime, q=1 and performance will greatly suffer. M*q as a block size is a second limitation. It restricts q to be small and performance suffers when q is small.

In column 7, lines 43 to 67 and column 8, lines 1 to 19 Lao discusses details of how it handles its permutation vectors. The total size of the permutation vectors is the size of the block matrices plus the number of cycles. In contrast, the present invention uses only the number of cycles. We remark

---

ALGORITHM IN-PLACE RECTANGULAR TRANSPOSE (IRX)

A is an M by N matrix with LDA >= M stored in standard CM format. A is stored in a one dimensional array A(0:LDA*N−1). MB and NB are given blocking parameters.
Step 0: put LDA = m*MB + r and N = n*NB + q. Note, we work with LDA and N
    instead of M and N. In many cases, LDA = M. Let M1 = m*MB and N1 = n*NB.
Step 1: save the last q columns of A as a matrix ALC of size LDA by q in buffer BUF.
    ALC = A(0:LDA−1,N1:N−1). Define ALR of size r by N1 = A(LDA−M1:LDA−
    1,0:N1−1). Also, save ALR in buffer BUF.
Step 2: Contraction step: Move in-place A1 = A(0:M1−1,0:N1−1) of matrix A to array
    space A(0:M1*N1−1). This can be done as mostly DCOPY calls on vectors of
    length M1. There will be a few vectors moves of length M1. In total there will be
    N1 such DCOPY calls or vector moves.
Step 3: transform CM A1 to RB A1
    DO J = 0, N1−NB, NB
        CALL VIPX(MB,m,NB,A1(0,J))
    ENDDO
Step 4: transform M1 by N1 RB A1 to RB A1^T in-place; the result is re-named to be
    A1. A1 is now N1 by M1.
    CALL BIPX(MB,NB,m,n,A1) ! A1 -> A1^T in-place
Step 5: transform n by m RB A1 to CM A1
    Do J=0, M1−MB, MB
        CALL VIPX(NB,MB,n,A1(0,J))
    ENDDO
Step 6: Expansion step: Move in-place A1 = A(0:M1−1,0:N1−1) of matrix A to array
    space A(0:N*LDA−1). This can be done as mostly DCOPY calls on vectors of
    length N1. There will be a few vectors moves of length N1. In total there will be
    M1 such DCOPY calls or vector moves.
    Note: on input CM A1 has LDA = N1. On output, A1 has LDA = N and holes
    have been produced in A1 to receive ACL and ACR which are in BUF. We now
    rename A1(0:N−1,0:LDA−1) to be A.
Step 7: Use a standard out-of-place transpose algorithm on ALC in BUF to put ALC^T in
    A(N1:N−1,0:LDA−1) and on ALR in BUF to put ALR^T in A(0:N1−1,
    M1:LDA−1).

---

Comparison of the Present Invention with the Method of Lao et al.

Having explained the method of the present invention, we now describe how it compares with the method described in Lao. Lao somewhat resembles its FIGS. 1 and 2 of the present invention in its global function. This conventional method assumes its q (our NB) evenly divides N.

In contrast, in the present invention, it is assumed that LDA=M. In fact, Lao never mentions LDA which we consider to be a very important omission. Lao also states that q is chosen so that M*q columns of A fit into cache. We observe that the numbers of cycles of a permutation is usually much smaller than the size of the permutation.

We close this discussion with how box 108 relates to the present invention's IRX algorithm. (IRX stands for In-place Rectangular Transpose). We have already stated how the present invention IRX differs from Lao in boxes 100 to 106. There are three steps to the present invention's IRX when M=m*MB and N=n*NB. They are steps 3 to 5 above of IRX. Boxes 100 to 106 relate to IRX step 3 of going from CM to RB format. Actually, RB is always SB for Lao. Box 108 relates to steps 4 and 5 of IRX: A1<-A1^T is step 4 of IRX and A1 going from RB to CM is step 5 of the present invention. As mentioned, Lao, in Box 108, only says apply a permutation to the matrix. To us, this clearly appears to be indefinite.

Exemplary Second Embodiment

Now we turn to the other standard data structure for matrices call packed matrices. For packed matrices the results are not so nice because the permutation structure of the mapping in the packed case does not share many of the properties of the linear M by N rectangular matrix A case.

In this exemplary second embodiment, the present invention takes a packed matrix A, which is either symmetric or triangular, and transforms it to another matrix format which contains the original data.

Figure 4:
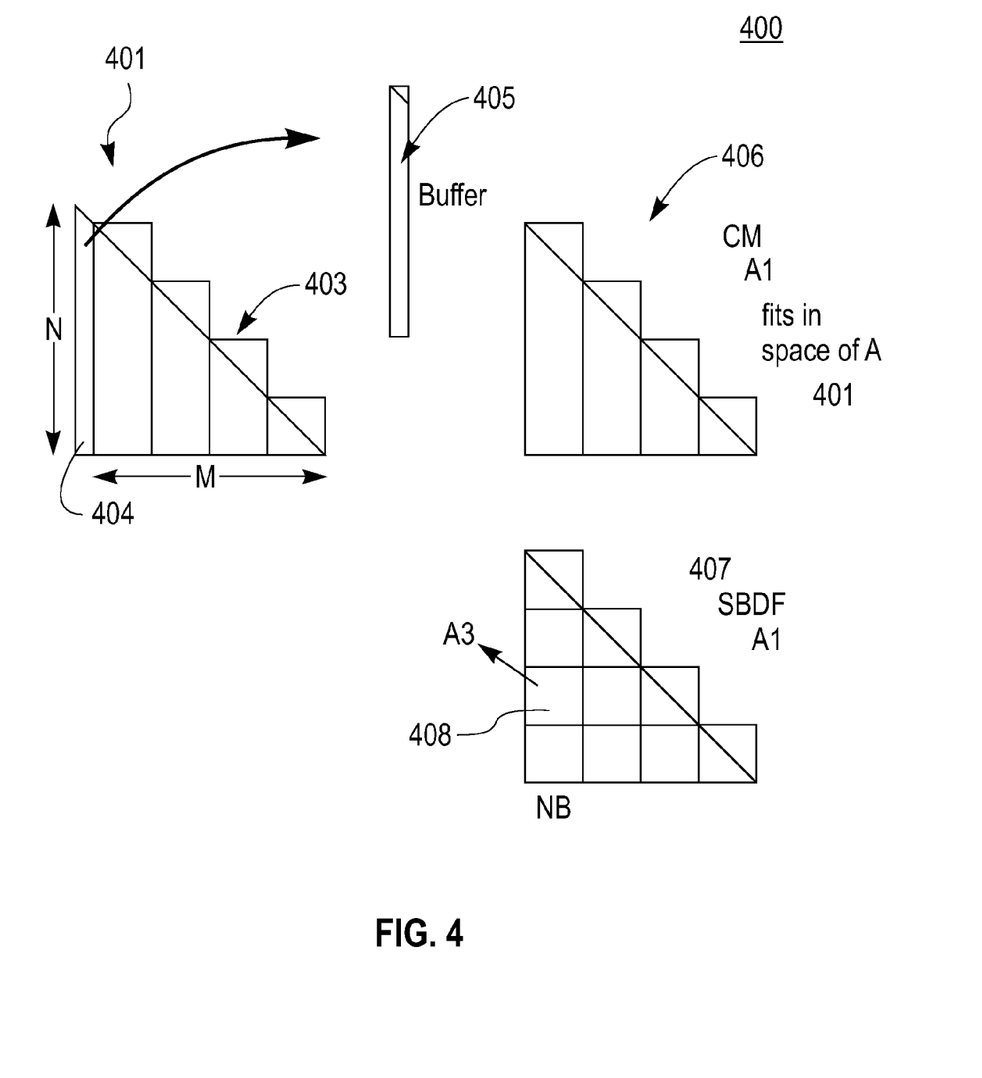
FIG. 4 shows the method 400 of the present invention as applied to matrix data in a packed format.

As exemplarily shown by the method 400 represented in FIG. 4 let matrix A 401 be an order N packed matrix. Matrix A 401 resides in an array AP of size nt=N*(N+1)/2. Let NB be a block size. Let A1 403 be an order M=m*NB Square Block Packed Format (SBPF) matrix representation of A1, a sub matrix 402 of A, whose array size mtb=mt*NB^2 is less than or equal to nt. Here mt=m*(m+1)/2. The first N−M columns 404 of AP are saved in buffer B 405. The remaining M columns of AP are transformed in-place inside the space of AP to form move expanded Column Major (CM) T(A1), as explained in more detail below. Then the remaining N−M columns are retrieved from B and placed back into holes left in moved expanded CM T(A1).

Similar to the first embodiment described above, this second embodiment also can be used for both performance and storage reasons in many applications of Dense Linear Algebra (DLA), and also has good SMP parallel implementation.

This second embodiment also shows that cache blocking is amenable to a matrix transformation T of packed arrays. The advantage is a large performance gain. One could let NB=1. That would be equivalent to using a point form of the transformation which would be about several hundred times slower than a block form of the algorithm. In the point form no extra storage is required. In the block form, a buffer B of size about N*NB is required.

As exemplarily shown in FIG. 4, for the packed format, a key idea is to convert order N packed A of size nt=N*(N+1)/2 into AP into order M=m*NB A1 SBPF format of size mtb=mt*NB^2 and mt=m*(m+1)/2 where N−M is small. See 401 for order N packed A. Order M SBPF A1 is shown at 403. This can be done by a series of fast transformations. One gets a smaller SBPF matrix A1 of order M. One finds the block cycle structure of T(A1) by applying the transformation T to B1 where B1 is the point form of SBPF A1. In matrix A1 each cycle move in A1 consists of moving an order NB sub matrix of A1 to another empty location of AP of size NB^2. A buffer of size NB^2 is required do all of these moves.

Since M<N, even when N is a multiple of NB, there is an area whose size is trapezoid T1, see 404, with base N−M and sides N and N−M+1 that needs to be saved in a buffer B, see 405. M is chosen so SBPF A1 fits into the packed space of order N packed A; ie, nt≥mtb. See 406. Call step 0 the finding of M and N with this property. This T1 part of AP is saved in Buffer B and then one can deal with the eventual SBPF matrix A1. Call this transfer Step 1. Note that A1, which consists of M columns of A is still in AP in standard packed format after Step 1. Usually, T1 is the first N−M columns of packed A and packed A1 is the last M columns of packed A, see 403.

Recall that M<N. In step 2, we move forward packed order M A1 into a compact space of size mtb. Call this new compact matrix CM block packed format A1 consisting of m contiguous block CM swaths. The packed format order M A1 of 403 is moved to 406. Actually 406 reside in 401 as it has moved over the 404 area of 401 to make for the bulges in 403. This is okay, as 404 has been copied to 405. We now briefly describe how one gets from CM block packed format to SBPF A1. Call this step 3. In FIG. 4 this is the process of going from 406 to 407. Consider NB contiguous columns of CM A1(J:J+NB−1) where J=j*NB; call this matrix A3. See 408.

Think of A3 as a j by NB matrix whose elements are column vectors of length NB. A3 is a column swath of matrix A1. Again see 408. There are m swaths and they constitute all of A1. In 407, m=4. Now, apply the point transposition algorithm VIPX to this j by NB matrix A3 of vectors of length NB. The result is that now A3 has been replaced (over-written) as A3^T which is a size NB by j matrix of vectors of length NB. It turns out, as a little reflection will indicate, that A3^T consists of j order NB SB matrices concatenated together. See 407 which is the result of VIPX applied m=4 times to 406. One can do this operation in parallel for each of these j sub matrices A3 of A1. After completion of these m parallel steps one has transformed CM blocked packed A1 in-place to be A1 as a SBPF matrix A1 consisting of mt SB's.

The process of going from A3 in SB format to A3 in CM format is the "transpose" of the above procedure; i.e., given NB by j A3^T one transposes A3^T to (A3^T)^T in-place to get j by NB A3 in CM format (see 408 of FIG. 4). Call these two processes P CM to SB, algorithm VIPX, and PA^−1 SB to CM, also using algorithm VIPX, as transpose applied twice is the identity transformation.

So, we can vector transpose each of the m CM swaths A3 in place by the method P we have already described. This result is order M SBPF A1. In FIG. 4, we stop here as our T in FIG. 4 is I.

Step 4 is the process of applying the transformation T to order M SBPF A1: we will get T(A1) as mt SB's. Step 5 is applying the inverse of process P=P^−1 to T(A1). Now, T(A1) is in CM format. We then, as Step 6 move expand CM T(A1) backwards in the array space of AP leaving spaces for matrix elements of packed A of array AP in buffer B. Finally, as Step 7 we use the buffer B and copy its contents out-of-place into the vacant places of the expanded packed T(A1) matrix. We have now described all the essential features of the algorithm.

The SMP parallel algorithm is obtained by letting different processors move the disjoint cycles associated with the transformation T of the small order matrix B1. If B1 only has a few large cycles then one cuts these cycles into several pieces. Each processor can move a disjoint piece of such a single long cycle. This covers step 4. Clearly, step 3 and 5 can be parallelized easily. Also, steps 2 and 6 are almost all M stride one dcopy operations and so, are easily parallelized.

In many cases, T will be the identity transformation I. FIG. 4 is describing this case. When T=I a user is interested in obtaining a SBPF representation of packed A. In this case, the eight step procedure above can be simplified. We describe two cases.

In case 1, SBPF A uses buffer B and AP(0:mtb−1) as storage. Steps 0 to 3 above are used. In FIG. 4 we are describing case 1. The final result is buffer 405 and SBPF A1 shown at 407.

In case 2, we describe a way to get a hybrid SBPF representation of packed A; we store the diagonal blocks of packed A in RFP format.

In case 2, we need not use steps 1 to 3. Instead, we use buffer B as a means of performing standard out-of-place algorithms. Therefore, we only cover modifications to steps 1 to 3. Consider a column swath of b consecutive columns from packed A of size S by b. The column swath is a trapezoid T1 of sides S and S−b+1 and base b. Let buffer B have size S*b.

B can hold a square block of order b=r and n NB by b rectangles if S=n*NB+r. Here, S=N the order of packed A and the condition holds for the left-over swath of packed A. All remaining n swaths have size k*NB by NB where 1≤k≤n. We apply steps 2 and 3 for all n+1 swaths using buffer B as the target area of Step 2 and B itself for step 3. Step 1 is not used. There is an additional step which consists of out-of-place operations from buffer B back to the swath. Again, standard out-of-place algorithms can be used and, hence, need not be covered in this discussion.

Exemplary Hardware Implementation

Figure 5:
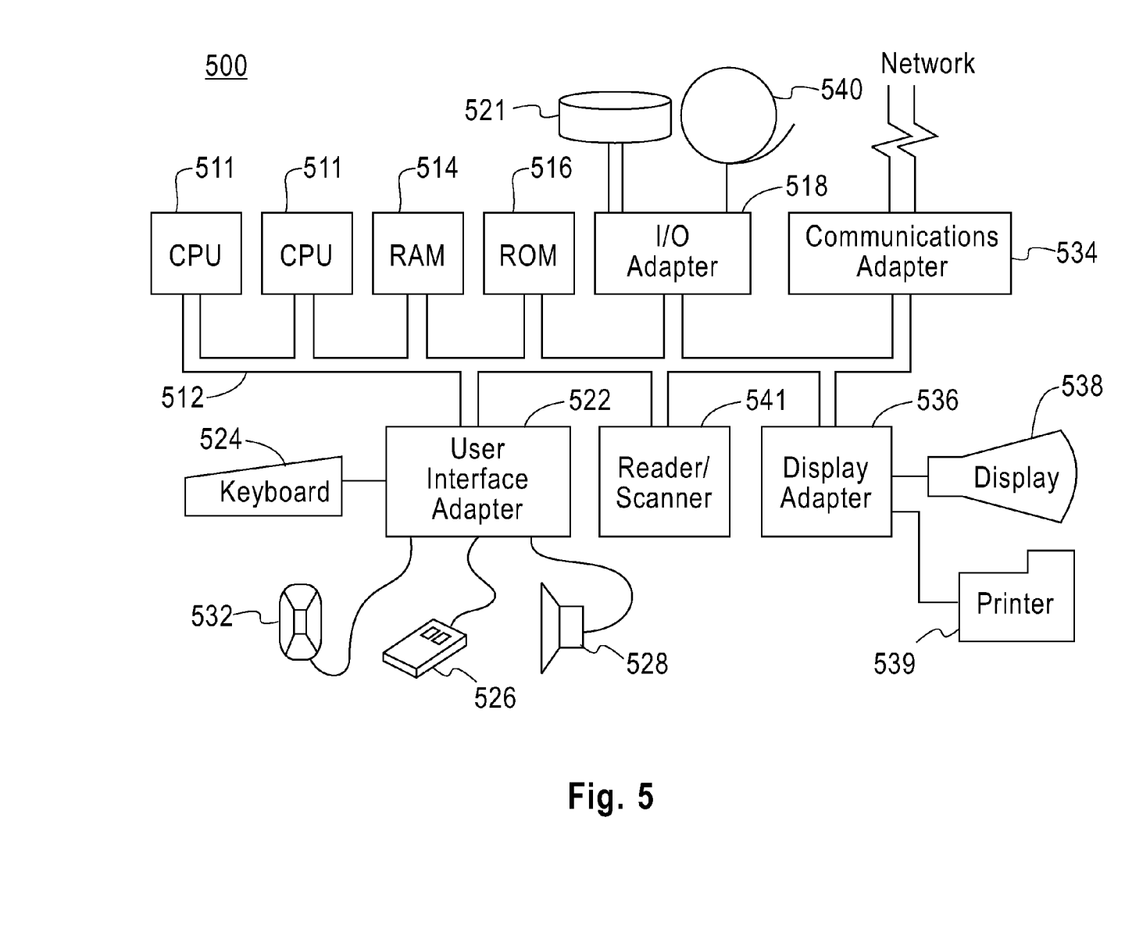
FIG. 5 illustrates an exemplary hardware/information handling system 500 for incorporating the present invention therein.

FIG. 5 illustrates a typical hardware configuration of an information handling/computer system in accordance with the invention and which preferably has at least one processor or central processing unit (CPU) 511 with one or more associated caches such as an L1 or L2 cache.

The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, an Intranet, a personal area network (PAN), etc., and a display adapter 536 for connecting the bus 512 to a display device 538 and/or printer 539 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 511 and hardware above, to perform the method of the invention.

This signal-bearing media may include, for example, a RAM contained within the CPU 511, as represented by the fast-access storage for example. Alternatively, the instructions may be contained in another signal-bearing media, such as a magnetic data storage diskette 600 (FIG. 6), directly or indirectly accessible by the CPU 511.

Figure 6:
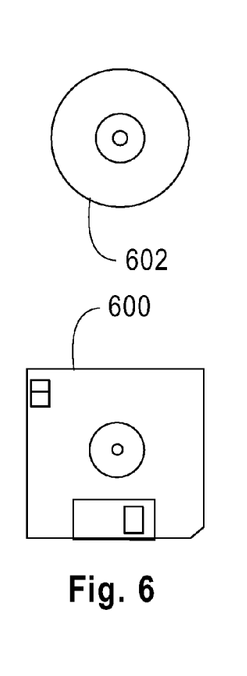
FIG. 6 illustrates a signal bearing medium 600 (e.g., storage medium) for storing steps of a program of a method according to the present invention.

Whether contained in the diskette 600, the computer/CPU 511, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

In yet another aspect of the present invention, it should be apparent that the method described herein has potential application in widely varying areas for analysis of data, including such as areas as business, manufacturing, government, etc. Therefore, the method of the present invention, particularly as implemented as a computer-based tool, can potentially serve as a basis for a business oriented toward analysis of such data, including consultation services. Such areas of application are considered as covered by the present invention.

While the invention has been described in terms of a single exemplary embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A computerized method for an in-place transformation of matrix data, said method comprising:
   for a matrix A having a size M×N, as stored in a memory of a computer in one of a standard full format or a packed format in one of a column major format or a row major format, and for a transformation T having a compact representation, choosing blocking parameters MB and NB based on a cache size of the computer such that MB*NB lies between an L1 cache size and an L2 cache size, and using a processor on the computer to perform the steps of:
   determining a size M1×N1 for blocking matrix A into a plurality of sub-matrices, and values m and n, such that M1=m*MB and N1=n*NB;
   determining whether any residual exists in said matrix A data if matrix A is blocked into sub-matrices, by determining whether either r or q is greater than zero, where M=m*MB+r and N=n*NB+q, and, if so, allocating at least one buffer area in memory and moving any said residuals r and/or q, respectively, into said at least one buffer area;
   executing a contraction processing on data of matrix A1=A (0:M1−1,0:N1−1) to convert said data in-place to an array space A(0:M1*N1−1);
   converting said array space A(0:M1*N1−1) into a New Data Structure (NDS) matrix A1 wherein said data is stored in memory as contiguous data in increments of blocks of said size MB×NB;
   transforming, in-place, said matrix A1 in NDS format by sequentially reading into the cache, transforming, and storing each MB×NB block;
   executing an expansion processing to convert said transformed matrix A1 in NDS format back into said one of column major format or row major format, leaving a hole or holes to replace the residual data of said at least one buffer area; and
   executing an out-of-place transformation of contents of said at least one buffer area and storing the out-of-place transformed data into said hole or holes.

2. The method of claim 1, wherein said matrix A is stored as said standard full format and said NDS comprises a rectangular block (RB) format.

3. The method of claim 1, wherein said matrix A is stored as said packed format and said NDS comprises a Square Block Packed (SBP) format.

4. The method of claim 1, wherein said data transformation comprises a matrix transposition.

5. The method of claim 1, as implemented by an entity providing consultation services.

6. The method of claim 1, wherein a transformation T has a compact representation if said transformation, having size N, can be represented by a formula that uses a constant amount of space, independent of N.

7. The method of claim 1, wherein said data transformation comprises a matrix transformation between lower Square Block Packed Format (SBPF) and upper SBPF formats or between upper SBFT and lower SBPF formats.

8. The method of claim 1, wherein said data transformation comprises a matrix transformation between a packed format and a rectangular full packed (RFP) format or between RFP and packed formats.

9. The method of claim 1, wherein "in-place" means that a permutation of data is returned to a same location in a memory as used for the data originally.

10. An apparatus, comprising
a memory to store a matrix A of size M×N in one of a standard full format or a packed format, as stored in one of a column major format or a row major format, and instructions for performing a transformation T having a compact representation;
a hierarchical cache system comprising at least one an L1 cache and an L2 cache; and
a processor performing said transformation on said matrix A by:
choosing blocking parameters MB and NB based on a cache size such that MB*NB lies between a size of the L1 cache and a size of the L2 cache;
determining a size M1×N1 for blocking matrix A into a plurality of sub-matrices Ai, and values m and n, such that M1=m*MB and N1=n*NB;
determining whether any residual exists in said matrix A data if matrix A is blocked into submatrices Ai by determining whether either r or q is greater than zero, where M=m*MB+r and N=n*NB+q, and, if so, allocating at least one buffer area in memory and moving any said residuals r and/or q, respectively, into said at least one buffer area;
executing a contraction processing on data of matrix A1=A (0:M1−1,0:N1−1) to convert said data in-place to an array space A(0:M1*N1−1);
converting said array space A(0:M1*N1−1) into a New Data Structure (NDS) matrix A1 wherein said data is stored in memory as contiguous data in increments of blocks of said size MB×NB;
transforming, in-place, said matrix A1 in NDS format by sequentially reading into the cache, transforming, and storing each MB×NB block;
executing an expansion processing to convert said transformed matrix A1 in NDS format back into said one of column major format or row major format, leaving holes to replace the residual data of said buffer areas; and
executing an out-of-place transformation of contents of said at least one buffer area and storing the out-of-place transformed data into said holes.

11. The apparatus of claim 10, wherein said matrix A is stored as said standard full format and said NDS comprises a rectangular block (RB) format.

12. The apparatus of claim 10, wherein said matrix A is stored as said packed format and said NDS comprises a Square Block Packed (SBP) format.

13. The apparatus of claim 10, wherein said data transformation comprises a matrix transposition.

14. A non-transitory, machine-readable storage medium tangibly embodying a program of machine-readable instructions executable by a digital processing apparatus to perform a computerized method for an in-place transformation of matrix data, wherein said digital processing apparatus comprises a hierarchical cache system comprising at least one an L1 cache and an L2 cache, a memory, and a processor executing said method comprising:
for a matrix A having size M×N, as stored in the memory in one of a standard full format or a packed format in a column major format or a row major format, and a transformation T having a compact representation, choosing blocking parameters MB and NB based on the cache size such that MB*NB lies between the L1 cache size and the L2 cache size;
determining a size M1×N1 for blocking matrix A into a plurality of sub-matrices Ai, and values m and n, such that M1=m*MB and N1=n*NB;
determining whether any residual exists in said matrix A data if matrix A is blocked into submatrices Ai by determining whether either r or q is greater than zero, where M=m*MB+r and N=n*NB+q, and, if so, allocating at least one buffer area in memory and moving any said residuals r and/or q, respectively, into said at least one buffer area;
executing a contraction processing on data of matrix A1=A (0:M1−1,0:N1−1) to convert said data in-place to an array space A(0:M1*N1−1);
converting said array space A(0:M1*N1−1) into a New Data Structure (NDS) matrix A1 wherein said data is stored in memory as contiguous data in increments of blocks of said size MB×NB;
transforming, in-place, said matrix A1 in NDS format by sequentially reading into cache, transforming, and storing each MB×NB block;
executing an expansion processing to convert said transformed matrix A1 in NDS format back into said one of column major format or row major format, leaving a hole or holes to replace the residual data of said at least one buffer area; and
executing an out-of-place transformation of contents of said at least one buffer area and storing the out-of-place transformed data into said hole or holes.

15. The machine-readable storage medium of claim 14, wherein said matrix A is stored as said standard full format and said NDS comprises a rectangular block (RB) format.

16. The machine-readable storage medium of claim 14, wherein said matrix A is stored as said packed format and said NDS comprises a Square Block Packed (SBP) format.

17. The machine-readable storage medium of claim 14, wherein said data transformation comprises a matrix transposition.

18. The machine-readable storage medium of claim 14 as comprising one of:
a hard drive memory on a computer;
a RAM memory on a computer;
a storage device associated with a server; and
a standalone diskette of instructions to be inserted into a computer.

* * * * *